Figure 1:
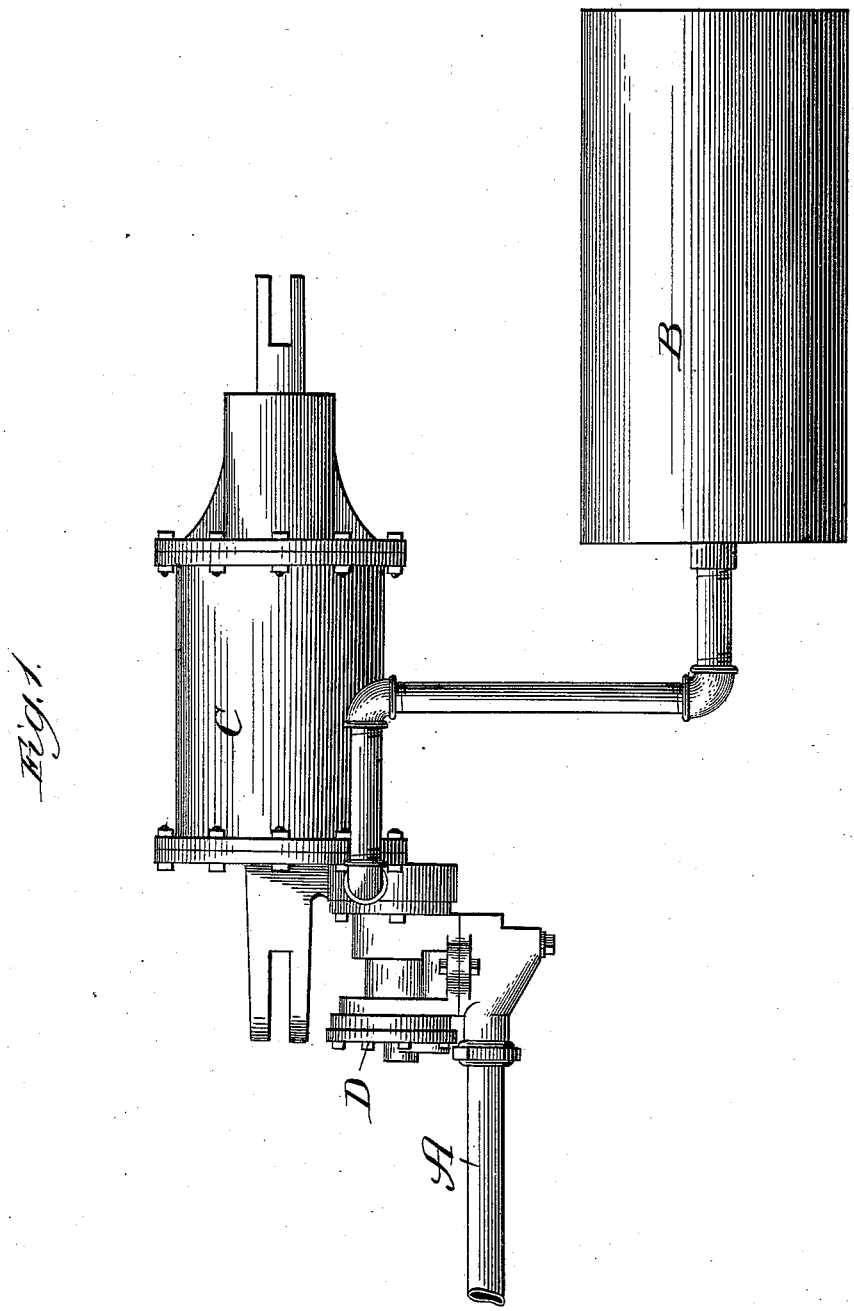

(No Model.) 2 Sheets—Sheet 1.

H. R. MASON.
VALVE DEVICE FOR AIR BRAKES.

No. 466,502. Patented Jan. 5, 1892.

Witnesses:
Chas. E. Gaylord,
Clifford N. White.

Inventor,
Harry R. Mason,
By Dyrenforth & Dyrenforth,
Attys.

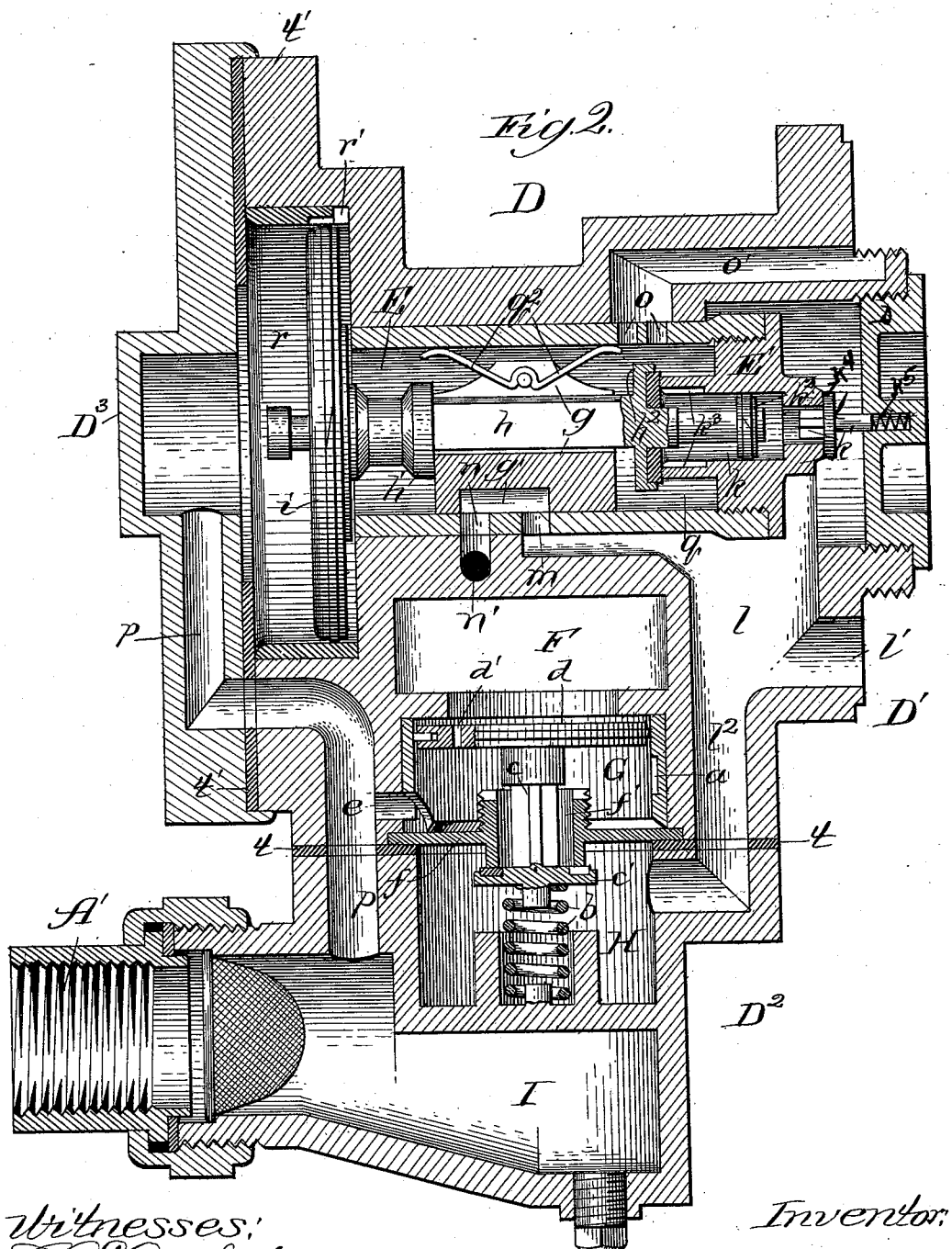

UNITED STATES PATENT OFFICE.

HARRY R. MASON, OF CHICAGO, ILLINOIS.

VALVE DEVICE FOR AIR-BRAKES.

SPECIFICATION forming part of Letters Patent No. 466,502, dated January 5, 1892.

Application filed August 22, 1891. Serial No. 403,439. (No model.)

*To all whom it may concern:*

Be it known that I, HARRY R. MASON, a citizen of the United States, residing at Chicago, in the county of Cook and State of Illinois, have invented a new and useful Improved Valve Device for Air-Brakes, of which the following is a specification.

My invention relates to an improvement in valves employed in air-brake systems of railway-trains, which are operated by variations of pressure in the train-pipe to direct pressure from the auxiliary reservoirs upon the cars to the brake-cylinders to apply the brakes for a service-stop, to vent the brake-cylinder to release the brakes, and, still further, to cause the passage of pressure from the train-pipe to the brake-cylinders direct for the purpose of an emergency-stop.

My object is to provide a valve device of the above character of an improved construction, which will render its operation particularly positive and reliable and give to it advantages over other devices of the same character hitherto employed in simplicity and economy of construction.

In the drawings, Figure 1 shows parts of an air-brake system including my improved valve device; and Fig. 2, a central longitudinal section, on an enlarged scale, of the valve device embodying my invention.

A represents the train-pipe; B, an auxiliary reservoir; C, a brake-cylinder, and D a valve device, technically known as a "triple valve," to which my invention relates. The valve device D is formed with a shell or casing, which for convenience of construction and to permit the ready adjustment and removal, when desired, of the internal mechanism may be in two parts $D'$ $D^2$, suitably secured together with an interposed gasket $t$ at the joints to guard against leakage. For the same reason the casing $D'$ is formed with open sides closed, respectively, as shown, by the cap $D^3$, bolted in place against an interposed gasket $t'$ and the screw-cap $s$. In the casing $D'$ are a valve-chamber E, an expansion-chamber F, and a valve-chamber G. In the casing $D^2$ are a chamber H and a drip-chamber I. The chamber E is formed with an enlarged portion $r$, which communicates through a passage $p$ with the chamber I, and a reduced portion $q$, which communicates through ports $o$ and a passage $o'$ with the auxiliary reservoir B, through a port $n$ and passage $n'$ with the outside air, and through a port $m$ with a passage $l$. The passage $l$ is in open communication through a branch passage $l'$ with the brake-cylinder C and through a branch passage $l^2$ with the chamber H. The end of the reduced portion of the chamber E is closed by a screw-plug $E'$, containing a chamber $k$, opening at one end into the chamber E and at its opposite end communicating through a passage $k'$ with the passage $l$. In the enlarged portion of the chamber E is a valve $i$, which fits closely at its periphery and slides against the wall of the chamber. The valve $i$ is upon one end of a stem $h$, which extends centrally through the chamber $q$ into the chamber $k$, where it carries a piston $k^2$. On the stem $h$, near the valve $i$, is a shoulder $h'$, and near its opposite end position it carries a valve $h^2$, which, when the stem is in the forward position shown, closes communication between the chambers $q$ and $k$. On the stem $h$, between the shoulder $h'$ and the shoulder formed by the valve $h^2$, is a slide-valve $g$, which is somewhat shorter than the distance between the said shoulders to permit the stem $h$ and its valves $i$ $h^2$ and piston $k^2$ to move a limited distance independently of the slide-valve $g$. In the face of the slide-valve $g$ is a grooved passage $g'$, of just sufficient length to open communication between the ports $n$ and $m$ when the valve is in the forward position shown, and a spring $g^2$ on the back of the valve $g$, which bears and slides against the opposite wall of the chamber $q$, operates to maintain the face of the slide-valve against its seat. At the end of the passage $k$ is a check-valve $k^4$, held normally closed in the direction of the chamber $k$ by a spring $k^5$, of a strength sufficient only to close the valve when the pressures on opposite sides thereof are equal.

The chambers F and G are in open communication, and the chambers G and H are divided from each other by a diaphragm $f$, provided with a central opening or passage $f'$. A passage $e$ through the wall of the chamber G affords constantly-open communication between that chamber and the passage $p$. In the chamber G is a valve $d$, which fits closely and slides against the wall of the chamber, and is provided with a small constantly-open passage $d'$ through it. The valve $d$ is on the end of a winged stem $c$, which extends through and is guided by the passage $f'$. In the chamber H the stem $c$ carries a valve $c'$, which seats in the direction of the chamber G over the opening of the passage $f'$. A spring $b$, of predetermined resistance, in the chamber H bears against the valve $c'$ and operates normally to maintain that valve closed and the valve $d$ at the forward limit of its movement.

In operation air enters from the train-pipe A at A', fills the chamber I, passes through the passage $p$ to the chamber $r$, and forces the valve $i$ forward to the position shown, wherein it registers with a small grooved passage $r'$ in the wall of the chamber. The valve $g$ is thus brought to the position of causing the groove $g'$ to register with the ports $n\ m$ to open communication between the brake-cylinder and outside air, and the valve $h^2$ closes the end of the chamber $k$. The air then passes around the valve $i$ through the groove $r'$ into the chamber $q$, and thence through the ports $o$ and passage $o'$ to the auxiliary reservoir B, filling the latter to approximately the same pressure as that in the train-pipe. The train-pipe pressure also passes from the passage $p$ through the opening $e$ to the chamber G, and thence through the small opening $d'$ in the valve $d$ to the expansion-chamber F. To apply the brakes gently for a service-stop, the engineer, as usual, will vent, say, ten pounds of pressure, gradually, from the train-pipe, which by producing a corresponding reduction in the chamber $r$ will cause the valve $i$, owing to the superior pressure then existing in the auxiliary reservoir and chamber $q$, to move backward until stopped by the opposite wall of the chamber $r$. In its movement the valve $i$ carries with it the valve-stem $h$, causing the slide-valve $g$ to close communication between the ports $m$ and $n$, thus cutting off escape of pressure from the brake-cylinder and chamber H to the outside air. At the same time the valve $h^2$ is opened and the piston $k^2$ drawn backward in the chamber $k$. In the wall of the end portion of the chamber $k$, adjacent to the chamber $q$, are grooved passages $k^3$, which may extend about one-half the distance of travel of the piston $k^2$. When the said piston in its backward movement reaches the grooves $k^3$, pressure from the auxiliary reservoir will pass through the chamber $k$ and passage $k'$, and, opening the valve $k^4$, pass thence through the branch passages $l^2\ l'$, respectively, to the chamber H and to the brake-cylinder C to apply the brakes with a graduating pressure. When the pressure in the auxiliary reservoir has reduced below that of the train-pipe, the valve $i$ will be moved by the train-pipe pressure a distance far enough to cause the piston $k^2$ to close the passage $k$ and shut off the flow of pressure to the brake-cylinder without moving the valve $g$ to release brakes. When the pressure in the train-pipe is reduced to the limited extent in the manner usual for service-stops, the air-pressure in the expansion-chamber F is not sufficiently above that of the train-pipe to move the piston $d$ against the resistance of the spring $b$ and air will retrogress from the chamber F through the small open passage $d'$ until the pressures on opposite sides of the piston $d$ become equal. When the train-pipe is vented suddenly for the purpose of an emergency-stop, the action of the valve mechanisms in the chamber E is the same as that described. The sudden impulse of the reduction of pressure in the train-pipe will also in this case be sufficient to cause the pressure in the expansion-chamber F to overcome the resistance of the spring $b$ and move the piston $d$ to open the valve $c'$ and let the train-pipe pressure through to the brake-cylinder. In this way the brakes may be applied with all the force of the train-pipe pressure, together with that of the auxiliary-reservoir pressure. The valve $c'$ will remain open until the pressure in the chamber F is reduced far enough to permit the spring $b$ to return the valve to its seat. To release brakes, pressure is re-established in the train pipe in the usual way and the ports are returned to the positions shown to shut off the flow from the auxiliary reservoir to the brake-cylinder, vent the brake-cylinder, and re-establish the pressure in the auxiliary reservoir and chamber F. In the wall of the chamber G is a groove $a$, with which the valve $d$ registers when driven backward by the expansion-chamber pressure, and thus opens a passage around the valve $d$ to co-operate with the passage $d'$ in effecting an equalization of the pressure on opposite sides of the valve $d$. In case of a breakage of the train-pipe or parting of a coupling between cars, the rapid exhaust from the train-pipe would cause the pressure in the expansion-chamber F to open the valve $c'$; but as the pressure in the expansion-chamber would escape very rapidly through the passages $d'$ and $a$ the valve $c'$ would be closed again by the spring $b$ before any material amount of pressure could escape from the auxiliary reservoir and brake-cylinder to the train-pipe. It will be seen that the quick-action-valve mechanism described, which causes the train-pipe pressure to be brought to bear against the brake-piston, is entirely separate from and independent of the valve mechanism which opens and closes communication between the auxiliary reservoir and brake-cylinder. In triple-valve devices hitherto employed and provided with quick-action-valve mechanisms the valve which opens direct communication between the train-pipe and brake-cylinder is operated by the auxiliary-reservoir pressure. With such valves in a case where it is necessary to effect an emergency-stop while service-stop is in operation, as where the train is on a downgrade, there is danger that the reduced auxiliary-reservoir pressure will not be capable of moving the quick-action-valve mechanism, while in my improved construction, no dependence being placed upon the auxiliary-reservoir air for the purpose, this danger does not exist. When the brakes are applied for a service-stop with all the pressure of the auxiliary reservoir—that is to say, when the pressures in the auxiliary reservoir and brake-cylinder are the same—a sudden impulse created for an emergency-stop will fill the brake-cylinder with the train-pipe pressure, and the valve $k^4$ will close to prevent the pressure in the brake-cylinder from becoming reduced by expansion into the auxiliary reservoir.

While I prefer to construct my improved valve device as shown and described, it may be modified with regard to details without departing from the invention. Instead of providing the device in compact form, as shown, the air-chamber F and quick-action-valve mechanism may be in separate casings from the rest of the valve device.

What I claim as new, and desire to secure by Letters Patent, is—

1. In an air-brake system for railway-trains, the combination, with valve mechanism controlling communication between the train-pipe and an auxiliary reservoir and between the auxiliary reservoir and a brake-cylinder, of a casing provided with a supplemental passage from the train-pipe to the said brake-cylinder, an expansion-chamber independent of the auxiliary reservoir, communicating with the train-pipe, and valve mechanism normally closing the said supplemental passage and opened by pressure from the expansion-chamber when the train-pipe pressure is reduced beyond a certain limit, substantially as and for the purpose set forth.

2. In an air-brake system for railway-trains, the combination, with a valve mechanism controlling communication between the train-pipe and an auxiliary reservoir and between the auxiliary reservoir and a brake-cylinder, of a casing provided with a supplemental passage from the train-pipe to the brake-cylinder, an expansion-chamber independent of the auxiliary reservoir, in open communication with the train-pipe, and spring-controlled-valve mechanism in said supplemental passage normally closing the same and opened against the resistance of its spring by the force of the retrogression of pressure from the expansion-chamber to the train-pipe when the train-pipe pressure is reduced beyond a certain limit, substantially as and for the purpose set forth.

3. In an air-brake system for railway-trains, the combination, with a valve mechanism controlling communication between the train-pipe and an auxiliary reservoir and between the auxiliary reservoir and a brake-cylinder, of a casing having a supplemental passage from the train-pipe to the said brake-cylinder, a spring-controlled valve in said supplemental passage normally closed in the direction of the train-pipe, an expansion-chamber independent of the auxiliary reservoir, in communication with the train-pipe to be charged with pressure therefrom, and a movable diaphragm between the said expansion-chamber and supplemental passage, connected with the valve in said passage, to be moved when the train-pipe pressure is reduced beyond a certain limit by the force of the retrogression of pressure from the expansion-chamber to the train-pipe to open the valve in the supplemental passage, substantially as and for the purpose set forth.

4. In an air-brake system for railway-trains, the combination, with a valve mechanism controlling communication between the train-pipe and an auxiliary reservoir and between the auxiliary reservoir and a brake-cylinder, of a casing having a supplemental passage between the train-pipe and brake-cylinder, valve-chambers G and H, interposed in said passage, an expansion-chamber independent of the auxiliary reservoir, communicating with the chamber G, a spring-controlled valve $c'$ in the chamber H, closed by a spring normally in the direction of the chamber G and train-pipe, a passage for air back and forth between the expansion-chamber and train-pipe, a movable diaphragm in the chamber G, exposed on opposite sides, respectively, to the train-pipe and expansion-chamber pressures and connected with the valve $c'$, the said diaphragm being moved by the expansion chamber pressure to open the valve $c'$ when the train-pipe pressure is suddenly reduced beyond a certain limit, and a second passage between the expansion-chamber and train-pipe, opened by movement of the said diaphragm, substantially as and for the purpose set forth.

5. In a brake mechanism, the combination, with the triple valve, of a casing having a supplemental passage affording direct communication between the train-pipe and brake-cylinder, an expansion-chamber in the casing, independent of the auxiliary reservoir and in communication with the train-pipe, whereby its pressure will normally be the same as that of the train-pipe, and valve mechanism normally closing the said supplemental passage and having a movable diaphragm exposed on opposite sides, respectively, to the train-pipe and expansion-chamber pressures to be moved from its normal position to open the said supplemental passage when the train-pipe pressure is suddenly reduced beyond a certain limit, substantially as and for the purpose set forth.

6. In a brake mechanism, the combination, with the train-pipe, a triple valve, auxiliary reservoir, and brake-cylinder, of a casing provided with a supplemental normally-closed passage extending between the train-pipe and brake-cylinder, an expansion-chamber communicating only with the train-pipe, and valve mechanism independent of the triple valve, operating by the expansion-chamber pressure and independently of the auxiliary-reservoir pressure to open the said supplemental passage when the train-pipe pressure is reduced, substantially as described.

7. In a brake mechanism, the combination, with a triple valve, of a shell provided with a normally-closed supplemental passage extending between the train-pipe and brake-cylinder, an expansion-chamber communicating with the train-pipe, and valve mechanism actuated by the expansion-chamber pressure to open the said supplemental passage on a reduction of the train-pipe pressure when the auxiliary-reservoir and brake-cylinder pressures are equal, substantially as and for the purpose set forth.

8. In a brake mechanism, the combination, in a triple valve, of the main-valve chamber having ports communicating, respectively, with the train-pipe, auxiliary reservoir, and outside air, a chamber $k$, communicating with the main-valve chamber and brake-cylinder, the main valve exposed on opposite sides, respectively, to train-pipe and auxiliary-reservoir pressures, the valve-stem movable with the main valve, the slide-valve operated by the valve-stem to open and close communication between the brake-cylinder and outside air, and a piston-valve in the chamber $k$, in fixed relation to the valve-stem, operating to open communication between the auxiliary reservoir and brake-cylinder when the main valve is at the backward limit of its movement under pressure from the auxiliary reservoir and to close said communication with the initial movement of the main valve in the forward direction under pressure from the train-pipe, substantially as described.

9. In a brake mechanism, the combination, with a quick-action-valve mechanism, of a triple-valve casing provided in the passage extending between the auxiliary reservoir and brake-cylinder, with a valve to close the said passage when the pressure in the brake-cylinder exceeds that in the auxiliary reservoir, substantially as and for the purpose set forth.

HARRY R. MASON.

In presence of—
J. W. DYRENFORTH,
A. DYRENFORTH.